UNITED STATES PATENT OFFICE.

WILLIAM H. WHITNEY, JR., AND CHARLES W. GRIFFIN, OF BROOKLYN, NEW YORK.

COMPOSITION OF MATTER USED AS AN INTERIOR FINISH FOR WALLS OR CEILINGS.

969,432.                Specification of Letters Patent.      Patented Sept. 6, 1910.

No Drawing.      Application filed April 11, 1910. Serial No. 554,646.

*To all whom it may concern:*

Be it known that we, WILLIAM H. WHITNEY, Jr., and CHARLES W. GRIFFIN, citizens of the United States, residing at Brooklyn, Kings county, New York, have invented a new and useful Composition of Matter Intended to be Used Particularly as an Interior Finish for Walls or Ceilings, of which the following is a specification.

We are aware that other compositions have been used for the same purpose and that various patents have been granted thereon, but we are not aware that the ingredients of our composition have been used together.

It is essential in a composition of this nature that it may be applied with ease and convenience and that the surface after application may have an even, hard finish from which defacements may be washed without injury thereto.

We have also secured in our compound a mixture which will remain in solution to a greater extent than has been hitherto obtained, and this is important as affecting the use of the composition if it has been put up for some time.

The fibrous nature of some of our ingredients also gives our compound a greater staying quality after it has been applied to a surface.

Our composition consists of a liquid and a pigment, the liquid constituting about 30 per cent. and the pigment about 70 per cent. of the compound.

The pigment is composed as follows:

| | |
|---|---:|
| Lithopone | 67.90% |
| Zinc oxid | 12.34% |
| Silicate of aluminum | 9.89% |
| Silicate of magnesia | 9.87% |
| | 100.00 |

The liquid is composed as follows:

| | |
|---|---:|
| Prepared linseed oil | 26.92% |
| Texene | 46.15% |
| Benzin | 15.38% |
| Japan | 7.69% |
| Turpentine | 3.86% |
| | 100.00 |

Our composition is prepared by mixing thoroughly the ingredients of the pigment with the prepared linseed oil, the benzin, the japan and one-third of the texene. This operation produces a compound of a semi-paste consistency which is then ground through a bur stone mill to procure a fine smooth paste in which all the ingredients are thoroughly combined and united. This paste is then reduced in another mixer by the addition of the turpentine and the remaining two-thirds of the texene.

We claim:

1. The herein described composition of matter, consisting of lithopone, zinc oxid, silicate of aluminum, silicate of magnesia, prepared linseed oil, texene, benzin, japan and turpentine substantially as described and for the purpose specified.

2. The herein described composition of matter, consisting of about thirty per cent. liquid and about seventy per cent. pigment, the liquid being composed of about 26.92% prepared linseed oil; 46.15% texene; 15.38% benzin; 7.69% japan and 3.86% turpentine and the pigment being composed of about 67.90% lithopone; 12.34% zinc oxid; 9.89% silicate of aluminum and 9.87% silicate of magnesia.

In witness whereof, we have hereunto set our hands this ninth day of April, 1910.

WILLIAM H. WHITNEY, JR.
    CHARLES W. GRIFFIN.

Witnesses:
    IDA I. MURCH,
    EMILY L. FITCH.